B. M. W. HANSON.
METAL CUTTING TOOL.
APPLICATION FILED JUNE 4, 1906.
1,089,376.
Patented Mar. 3, 1914.
2 SHEETS—SHEET 2.
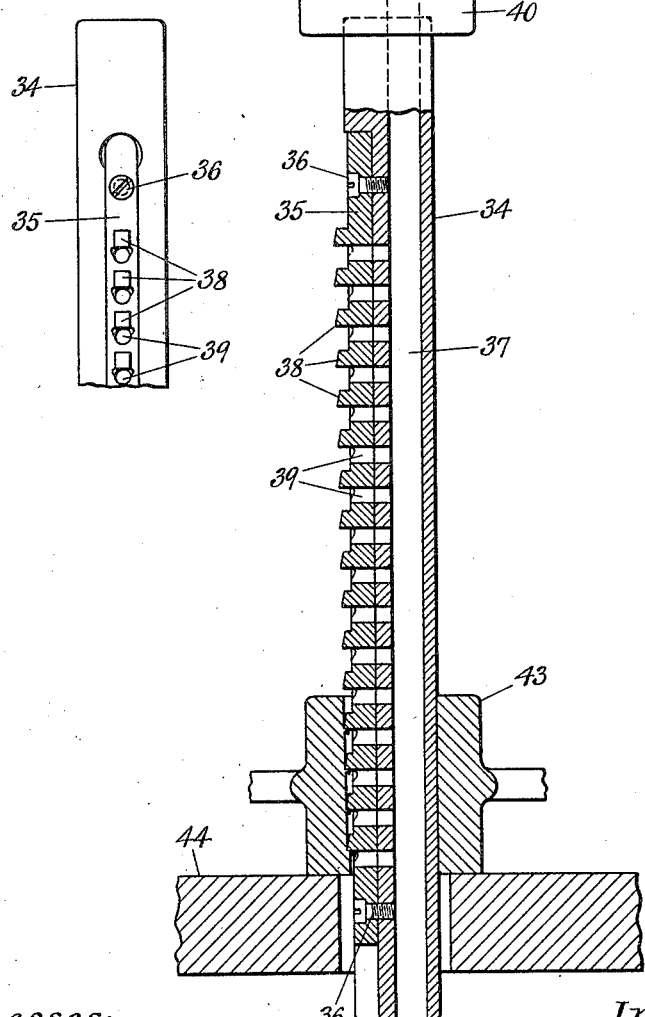
Witnesses:
H. Mallner
Janette S. Ellsworth
Inventor
B. M. W. Hanson
By Wm H Honiss, Att'y.

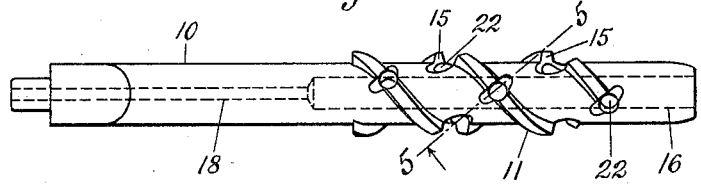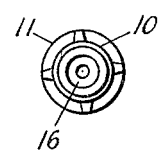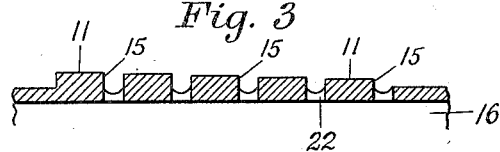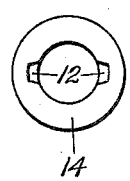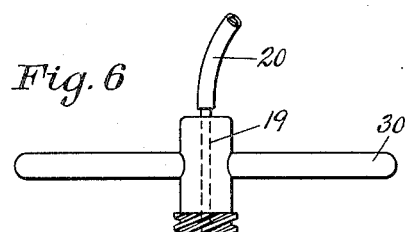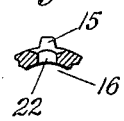

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-CUTTING TOOL.

1,089,376.  Specification of Letters Patent.  Patented Mar. 3, 1914.

Application filed June 4, 1906. Serial No. 320,075.

*To all whom it may concern:*

Be it known that I, BENGT M. W. HANSON, a citizen of Sweden, and a resident of Hartford, in the county of Hartford and State of Connecticut, have invented certain new and useful Improvements in Metal-Cutting Tools, of which the following is a full, clear, and exact specification.

This invention relates to improved means for cutting splines, keyways, and particularly for the cutting of internal grooves, such as screw threads, ordnance rifling, and work of that class, wherein it is desirable to follow along the same path or groove with a succession of cutting edges. The principal difficulty in nearly all such work is to discharge the chips from each of the cutting edges, so as to keep them out of the way of the succeeding edges, and to convey a proper supply of oil to each of the said edges. In this invention, these difficulties are overcome by employing a subway extending in the same general direction as the series of teeth and adjacent thereto, and having openings leading to the respective teeth or cutting edges.

This invention is herein shown to be embodied in two different adaptations, one for the cutting of a plurality of spiral grooves in the inner wall of a cylindrical bore, and the other for cutting a longitudinal groove, such as a keyway in the hub of a gear or pulley.

Figure 1 of the drawings is a side view, and Fig. 2 an end view of a tool embodying the present invention, and adapted to cut two oppositely disposed spiral grooves, like the internal threads of a nut, or the rifling of a gun barrel. Fig. 3 is a side view of a flat development of one of the spiral cutting ribs, showing the succession of teeth thereon, with the passages leading from the teeth to the discharge channel or subway. Fig. 4 is an end view of a piece of work, showing the form and disposition of the grooves which would be cut therein by the tool of Figs. 1 and 2. Fig. 5 is a fragmentary end view in section taken on the line 5—5 of Fig. 1, showing only one of the cutting ribs, or rows of teeth. Fig. 6 is a side elevation of a machine suitable for utilizing the tool of Figs. 1 and 2, showing that tool in operation upon a piece of work like that of Fig. 4. Figs. 7, 8 and 9 are views of another form of tool embodying this invention, the said tool being here shown to be adapted for cutting a straight keyway or splineway in the bore of a gear or pulley, or similar member. Fig. 7 is an end or plan view of the tool. Fig. 8 is a side view of the tool in section taken on the line 8—8 of Fig. 7, and showing also in connection therewith a hub to be splined, a supporting table and the engaging end of the spindle or ram employed for pushing the tool through the work. Fig. 9 is a front view projected from Fig. 8.

In the embodiment of this invention shown in Figs. 1 and 2 the body 10 of the tool is provided with the teeth 11, which are disposed upon the body 10 in spiral form, corresponding to the desired form of the grooves 12 to be cut in the work 14. A convenient way, according to modern methods, is to first turn the tool to a cylindrical form, of a diameter equaling that of the outer diameter of the teeth, and then to mill or otherwise cut away the spaces between the spiral rows of teeth, thus forming the whole as spiral ribs having the proper cross-section for the desired cut. These ribs are then milled across at suitable intervals, as best shown in Fig. 5, thus forming the faces 15 of the cutting teeth, which are successively reduced toward the point of the tool, to apportion the cut between the several teeth. The channel or subway 16 is formed in the tool in any convenient way. In the case of a circular tool like that of Figs. 1 and 2 it can conveniently be formed by boring the tool out concentrically. When it is desired to force a supply of oil to the teeth, or to employ a blast of air to blow the chips out, the subway may be continued to the upper end of the tool, or a reduced passage 18 may be carried to that end, or to any portion thereof at which it may be most convenient to connect with the supply of oil or air pressure, as the case may be, it being commonly found most convenient to carry this supply through the center of the spindle, as shown at 19 in Fig. 6, the supply being brought to the end of the spindle in any convenient way, as by a flexible tube 20.

The sub-channel or subway 16 communicates with the face of the respective teeth by means of passages 22, which may be conveniently formed by drilling round holes in front of the faces of the teeth, the upper edges of the holes being rounded, chamfered, or otherwise carved out so as to form an easy entrance for the chips.

A tool of this character may be employed in many ways and in various types of machines. For example, when employed in connection with a lathe it may be mounted upon the lathe centers, and the work be clamped upon the carriage of the lathe, the feed screw being geared so as to move the work along in suitable relation to the spiral of the tool, as the latter is rotated. Or, in other cases, the work may be made to revolve, as in a chuck, and the tool be clamped upon the carriage.

In Fig. 6 is shown a simple and effective apparatus which may be set upon a bench or table and operated by hand. It consists of a standard 25 having a clamping collet to receive the work 14. The upper end of the standard is threaded, or is bored to receive a nut 27, supporting the screw 28, which is threaded in accordance with the spiral of the tool to be employed, this screw 28 and its nut 27 being readily removable to permit the substitution of other screws and nuts of different pitches. The screw is provided with a hand-wheel or other handle 30, and as above described it may be provided with the passage 19 and a tube 20 through which air or oil may be forced to the tool.

In employing this apparatus, the work 14 is clamped in position in the collet 26, and the tool of Figs. 1 and 2 is placed in position as shown in Fig. 6. By turning the screw 28, the tool is carried downwardly through the work in the desired spiral path, so that the spirally arranged teeth, following each other in succession through the pathways of their respective grooves, successively cut out and enlarge these grooves until they reach the desired size and depth. The teeth are stepped as shown in Fig. 3, so that each successive cutting edge or tooth is given its proper share of cutting. The length of the tool and the number of cutting edges should be adapted to the character and extent of the work to be done. Thus a comparatively short tool may be employed for making small grooves, or only a few grooves, whereas a much longer tool would be required to properly distribute the work of cutting deep grooves, or a large number of grooves. Where the number or size of the grooves to be cut, or the character of the material cut makes it difficult to complete the cutting with a single tool of convenient length, two or more tools may be employed in succession, the teeth of the following tools being graded in size so as to properly follow and enlarge the grooves cut by the preceding tools.

The embodiment of this invention shown in Figs. 7, 8 and 9 is adapted to cut straight splines or keyways through the hub of a pulley. For this purpose I prefer to employ a cylindrical mandrel, which fits the bore of the pulley, and is grooved to receive a detachable cutter 35, which may be removably fastened in place by means of the screws 36, or in any convenient way. The cutter 35 is provided with teeth 38, which are graded or stepped so that each tooth will have the proper amount of cutting to do. This tool is shown to be provided with a sub-channel or subway 37, which communicates with each of the teeth 38, by means of a passage 39, through which the chips may pass from the teeth to the subway, and which also permits the oil to flow to each of the teeth when cutting material which requires the use of oil. The upper end of the subway 39 may communicate with a continuing passage 41 in the spindle 40. That spindle may be mounted in a splining machine, or in a ram of any desired or convenient type, and is pushed downwardly through the work 43, which is supported upon a table 44.

The lower ends of the subways 16 and 37 of these tools may be closed by means of a removable plug or valve 32; or they may communicate with a suitable receptacle 46 for oil or chips. When oil is employed for lubricating the cutting edges it may flow in at the upper end of the subways 16 or 37 for example, through the pipe 20, or may be forced up from below, by pressure devices such as a tank 47 and proper pipe connections which maintain oil at the level of the top of the work, so as not to waste it through the passages which are above the work. In the latter case the plug or valve 32 may be removed or opened to allow the oil to flow upwardly through the subway of the tool as the latter is carried downwardly below the level of the oil.

It will be obvious to mechanics and others skilled in this art that the invention shown herein may, by suitable modification and adaptation, be utilized, within the scope of the appended claims, for many kinds of work, besides those illustrated herein.

I claim as my invention:—

1. The combination, in a tool for cutting a channel in the wall of a cylindrical bore, of a body portion substantially fitting the said bore, a series of cutting teeth disposed in substantial conformity with the path of the desired channel, and successively increasing in cutting size, an internal subway in the body of the tool, and a separate opening for each tooth extending radially upward from the subway to the cutting faces of the respective teeth.

2. The combination, in a tool for cutting a curved channel, of a series of cutting teeth disposed in a curved path corresponding with that of the desired channel and successively increasing in size, a subway extending beneath the series of teeth, and a separate opening for each tooth extending radially outward from the subway to the cutting faces of the respective teeth.

3. The combination, in a tool for cutting a spiral channel, of a series of teeth disposed in conformity with the path of the intended spiral and successively increasing in cutting size, and a subway extending beneath the series of teeth provided with separate openings leading directly to the respective cutting faces of all of the said teeth.

4. The combination, in a tool for cutting spiral channels in the inner wall of a cylindrical bore, of a body substantially fitting the said bore, a series of teeth arranged in conformity with the intended spiral and successively increasing in cutting size, an internal subway extending through the body of the tool, and openings extending radially outward from the said subway directly to the respective cutting faces of all of the said teeth.

5. A tool for cutting and enlarging a plurality of channels in the wall of a cylindrical bore, including in combination a body portion approximately fitting the said bore, a plurality of series of teeth disposed on the said body in substantial conformity to the respective paths of the intended channels and successively increasing in cutting size, and an internal subway extending longitudinally through the body of the tool and provided with openings extending radially directly to the respective cutting faces of all of the teeth of each series.

6. A tool for cutting a spiral channel in the inner wall of a cylindrical bore, including in combination a body portion approximately fitting the said bore, a series of teeth successively disposed in spiral relation upon said body in substantial conformity with the spiral path of the intended channel, the teeth being stepped to divide between them the work of cutting out the channel, and a subway extending beneath the series of teeth provided with openings directly and independently communicating with the respective cutting faces of each of the teeth.

7. The combination, with a tool for cutting channels, of a succession of cutting teeth disposed in the order of their intended cutting path, a subway within the tool provided with openings leading directly to the cutting faces of all of the said teeth, a support for the work in which the channels are to be cut, and means for feeding oil up through the subway and maintaining it approximately at the level of the top of the work for lubricating the cutting edges without wasting the oil through those of the said passages which are above the level of the work.

8. The combination, in a tool for cutting channels, of a series of cutting teeth disposed to follow each other in the path of the intended channel, an adjacent subway in the tool provided with openings leading directly to all of the cutting faces of the respective teeth, means for supporting the work in which the channels are to be cut, means for driving the said tool through the work, and means for forcing oil up through the subway from below and maintaining oil therein at approximately the level of the top of the work, for the purpose specified.

9. The combination, in a tool for cutting spiral channels, of a series of cutting teeth disposed in succession in the path of the desired spiral and stepped to divide between them the work of cutting, a subway extending adjacent to the series of teeth, provided with radially disposed openings for establishing direct communication between the subway and the cutting faces of all of the respective teeth, means for supporting the work and the tool in operative relation to each other, including means for forcing the tool spirally through the work, and means for forcing a supply of oil through the subway and maintaining it approximately at the level of the top of the work, for the purpose specified.

10. The combination, in a tool for cutting spiral channels, of a series of teeth disposed in succession in the path of the intended spiral, and stepped to divide between them the work of cutting, a subway extending adjacent to the series of teeth provided with openings for maintaining direct communication between the subway and the cutting faces of all of the teeth, and external means for guiding and forcing the said tool to carry its said teeth through their desired spiral cutting path.

In testimony whereof I have signed my name to this specification in the presence of two subscribing witnesses, this 2nd day of June, 1906.

BENGT M. W. HANSON.

Witnesses:
JOEL W. JOHNSON,
HENRY L. HUNTINGTON,